US009368020B1

(12) United States Patent
Bell et al.

(10) Patent No.: US 9,368,020 B1
(45) Date of Patent: Jun. 14, 2016

(54) OFF-PREMISES ALERT SYSTEM AND METHOD FOR WIRELESS POWER RECEIVERS IN A WIRELESS POWER NETWORK

(71) Applicant: ENERGOUS CORPORATION, San Jose, CA (US)

(72) Inventors: Douglas Bell, Pleasanton, CA (US); Michael Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 14/586,448

(22) Filed: Dec. 30, 2014

Related U.S. Application Data

(63) Continuation-in-part of application No. 14/330,926, filed on Jul. 14, 2014.

(51) Int. Cl.
*G08B 13/14* (2006.01)
*G08B 21/24* (2006.01)

(52) U.S. Cl.
CPC ...................... *G08B 21/24* (2013.01)

(58) Field of Classification Search
CPC ......... H02J 7/025; H02J 5/005; H04B 5/0037
USPC ....................... 340/568.1, 524, 539.11, 636.1; 320/108; 455/41.1
See application file for complete search history.

(56) References Cited

U.S. PATENT DOCUMENTS

| 4,360,741 | A | 11/1982 | Fitzsimmons et al. |
| 5,712,642 | A | 1/1998 | Hulderman |
| 5,936,527 | A | 8/1999 | Isaacman et al. |
| 5,982,139 | A | 11/1999 | Parise |

(Continued)

FOREIGN PATENT DOCUMENTS

| EP | 2545635 | 9/2011 |
| KR | 1020130026977 A | 3/2013 |

(Continued)

OTHER PUBLICATIONS

International Search Report dated Sep. 12, 2014 corresponding to International Patent Application No. PCT/US2014/037072, 3 pages.

(Continued)

*Primary Examiner* — Phung Nguyen
(74) *Attorney, Agent, or Firm* — Eric L. Sophir; Dentons US LLP

(57) ABSTRACT

Embodiments in the present disclosure may be directed to an off-premises alert system and method for one or more wireless power receivers in a wireless power network. The system and method may include automated software embedded on a wireless power receiver that may be triggered every time a wireless power receiver is turned on. The system and method may be employed in stores where customers may use wireless power receivers to charge their mobile devices such as smartphones, tablets, and the like, while being inside the store. The method may prevent customers from not returning the wireless power receiver by producing an audible alert in the power receiver. If customer fails to return wireless power receiver, the method may then automatically report details regarding the lost wireless power receiver to an appropriate authority through automatic communication connection through any intervening network cloud-based media.

6 Claims, 2 Drawing Sheets

(56) References Cited

U.S. PATENT DOCUMENTS

| | | |
|---|---|---|
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1 | 9/2004 | Charych |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 * | 5/2012 | Yamasuge ............ H04B 5/0037 307/104 |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,452,235 B2 * | 5/2013 | Kirby ................. H04B 5/0031 307/104 |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0309452 A1 | 12/2008 | Zeine |
| 2009/0096412 A1 | 4/2009 | Huang |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0254503 A1 | 10/2011 | Widmer et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0274154 A1 | 11/2012 | DeLuca |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0107023 A1 | 5/2013 | Tanaka et al. |
| 2013/0207604 A1 | 8/2013 | Zeine |
| 2013/0241468 A1 | 9/2013 | Moshfeghi |
| 2013/0241474 A1 | 9/2013 | Moshfeghi |
| 2013/0288600 A1 | 10/2013 | Kuusilinna et al. |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 * | 3/2014 | Kwon ................. H04B 5/0037 320/108 |
| 2014/0139180 A1 * | 5/2014 | Kim ................. H02J 7/025 320/108 |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |
| 2015/0244201 A1 * | 8/2015 | Chu ................. H02J 7/025 320/108 |

FOREIGN PATENT DOCUMENTS

| | | |
|---|---|---|
| WO | 9952173 A2 | 10/1999 |
| WO | 03091943 A1 | 11/2003 |
| WO | 2004077550 A1 | 9/2004 |
| WO | 2008156571 A2 | 12/2008 |
| WO | 2010022181 A1 | 2/2010 |
| WO | 2011112022 A2 | 9/2011 |
| WO | 2013035190 A1 | 3/2013 |

OTHER PUBLICATIONS

International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.

* cited by examiner

OFF-PREMISES ALERT SYSTEM AND METHOD FOR WIRELESS POWER RECEIVERS IN A WIRELESS POWER NETWORK

CROSS-REFERENCE TO RELATED APPLICATIONS

This application is a continuation-in-part of U.S. patent application Ser. No. 14/330,926, filed on Jul. 14, 2014, which is incorporated by reference in its entirety.

This application relates to U.S. Non-Provisional patent application Ser. No. 13/891,430 filed May 10, 2013, entitled "Methodology For Pocket-forming;" U.S. Non-Provisional patent application Ser. No. 13/925,469 filed Jun. 24, 2013, entitled "Methodology for Multiple Pocket-Forming;" U.S. Non-Provisional patent application Ser. No. 13/946,082 filed Jul. 19, 2013, entitled "Method for 3 Dimensional Pocket-forming;" U.S. Non-Provisional patent application Ser. No. 13/891,399 filed May 10, 2013, entitled "Receivers for Wireless Power Transmission;" U.S. Non-Provisional patent application Ser. No. 13/891,445 filed May 10, 2013, entitled "Transmitters for Wireless Power Transmission;" U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

FIELD OF THE INVENTION

The present disclosure relates generally to wireless power networks, and more specifically to an off-premises alert system and method for wireless power receivers in a wireless power network.

BACKGROUND

Electronic devices such as laptop computers, smartphones, portable gaming devices, tablets and so forth may require power for performing their intended functions. This may require having to charge electronic equipment at least once a day, or in high-demand electronic devices more than once a day. Such an activity may be tedious and may represent a burden to users. For example, a user may be required to carry chargers in case his electronic equipment is lacking power. In addition, users have to find available power sources to connect to. Lastly, users must plug in to a wall power socket or other power supply to be able to charge his or her electronic device.

An approach to mitigate this issue may include using RF waves through suitable power transmission techniques such as pocket-forming. This approach may provide wireless power transmission while eliminating the use of wires or pads for charging devices. In addition, electronic equipment may require less components as typical wall chargers may not be required. In some cases, even batteries may be eliminated as a device may fully be powered wirelessly.

The approach may enable the creation of wireless power networks similar in structure to regular wireless local area networks (WLAN) where a wireless access point is used to provide internet or intranet access to different wireless devices. A wireless power transmitter may provide wireless power charging to a plurality of wireless power receivers that may be embedded in covers for smartphones, tablets, or the like. These covers may be used in any commercial establishment by customers that seek to charge their mobile devices. However, since these covers may be small in size, they could be stolen from the establishment or people may just forget to return them when they leave the premises. Instead of covers, wireless power receivers may also be embedded within other form factors and/or connected to customer mobile devices directly or by appropriate cable.

For the foregoing reasons, there is a need for an off-premises alert system and method for wireless power receivers in a wireless power network.

SUMMARY

Embodiments in the present disclosure may be directed to an off-premises alert system and method for one or more wireless power receivers in a wireless power network. The system and method may include automated software embedded on a wireless power receiver that may be triggered every time a wireless power receiver is turned on.

In one aspect of the present disclosure, a system architecture that may enable the registration and communication controls between wireless power transmitter and one or more wireless power receivers is disclosed. Wireless power receivers may include covers and customer pocket-forming enabled devices.

In one embodiment, wireless power transmitter may include a microprocessor that integrates a power transmitter manager app (PWR TX MGR App), and a third party application programming interface (Third Party API) for a Bluetooth Low Energy chip (BTLE CHIP HW). Wireless power transmitter may also include an antenna manager software (Antenna MGR Software) to control an RF antenna array that may be used to form controlled RF waves which may converge in 3-D space and create pockets of energy on wireless power receivers (covers and customer pocket-forming enabled devices).

In another embodiment, covers may include a power receiver app (PWR RX APP), a third party application programming interface (Third party API) for a Bluetooth Low Energy chip (BTLE CHIP HW), and a radio frequency (RF) antenna array which may be used to receive and utilize the pockets of energy sent from wireless power transmitter.

In yet another embodiment, customer pocket-forming enabled devices may refer to a wireless device such as smartphones, tablets, or any of the like that may include an integrated wireless power receiver for wireless power charging. Customer pocket-forming enabled devices may include a power receiver app (PWR RX APP), and a third party application programming interface (Third Party API) for a Bluetooth Low Energy chip (BTLE CHIP HW). Customer pocket-forming enabled devices may also include an RF antenna array which may used to receive and utilize pockets of energy sent from wireless power transmitter. Said pocket-forming enabled device may feature a GUI app to manage or monitor the wireless power transmission system. GUI may be downloaded from any suitable application store and may run on any suitable operating system such as iOS and Android, among others.

In another aspect of the present disclosure, a flowchart of an off-premises alert method for one or more wireless power receivers in a wireless power network is disclosed. The method may include a series of steps where a customer may walk into a shop and request wireless power for charging his or her mobile device. The customer may then ask at the counter of the shop for wireless power, the employee of the shop may take a wireless power receiver or cover and register the customer with the wireless power receiver given to the customer. The customer may then use the wireless power receiver or cover to charge his or her mobile device such as a smartphone, tablet, or the like. The customer may spend the time he or she may need to charge his or her mobile device in the shop and then, when finished, return the cover. However, if the customer forgets to return the cover and leaves the premises, a power transmitter manager may detect distance or loss of communication with the wireless power receiver, and thus stop communicating and charging the wireless power receiver. Subsequently, the wireless power receiver may generate an audible alert that may increase as the customer walks further away from the shop where the wireless power transmitter manager is located. The customer may then hear the alert and return to the premises to handle the wireless power receiver to the shop. Furthermore, said power transmitter may respond to loss of communication connection with wireless power receiver, after a minimum period of time, by the assumption that said wireless power receiver is lost, and by next establishing a communication connection through the network cloud to a system management server or a remote information service that are both part of said power transmitter's wireless power transmission system. After establishment of said connection, power transmitter may communicate to the system management server or remote information service a detailed description of a lost missing wireless power receiver that may include receiver's unique identification (UUID), when and where it was lost, ID of power transmitter, and any other details. Subsequently, said remote information service may automatically communicate alerts, by text messages, SMS, email, or voice synthesis telephone call, to the proper authority to handle said loss.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
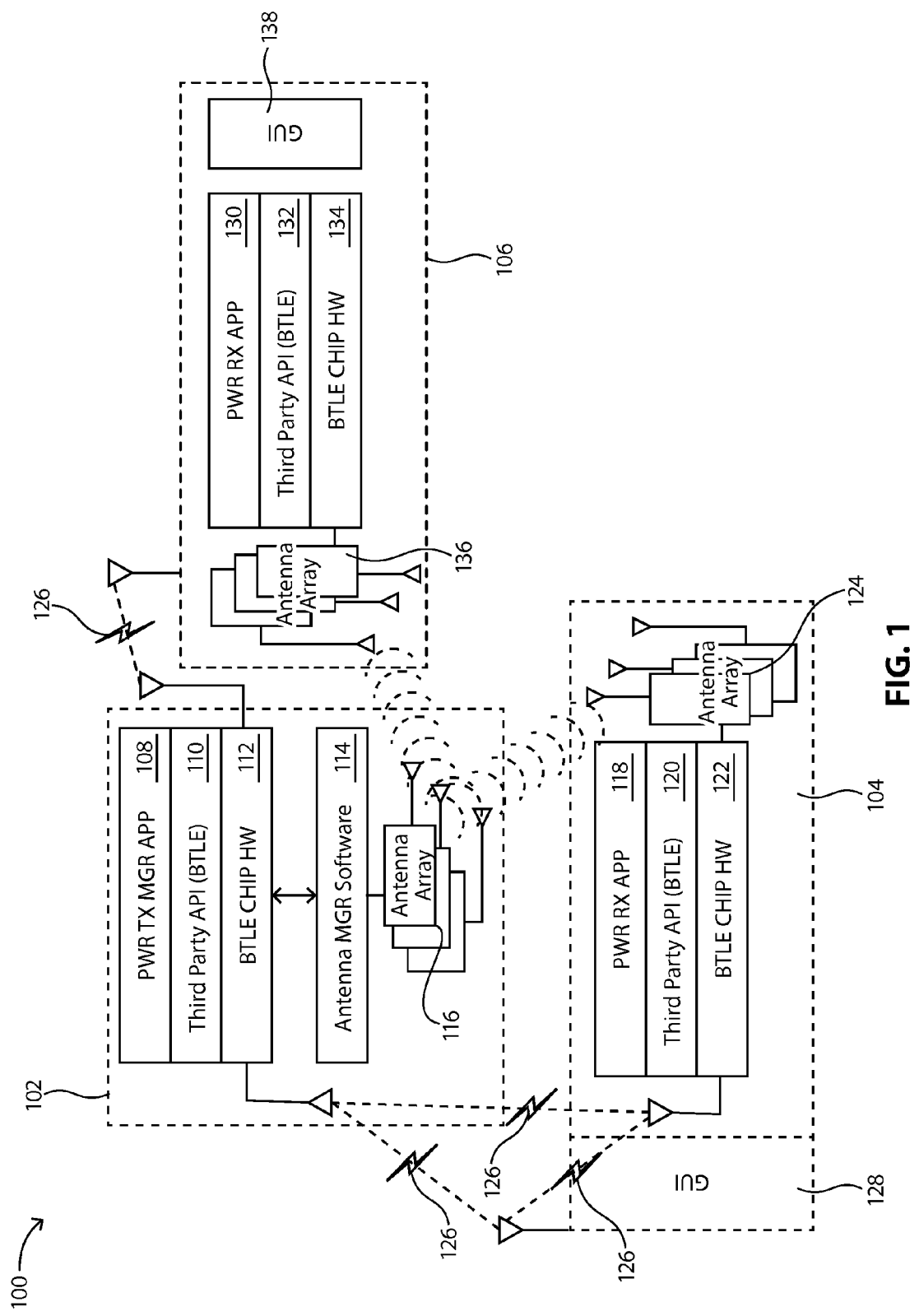
FIG. 1 shows a system architecture in which one or more embodiments of the present disclosure may operate.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Real time communication" refers to communicating the status of data at the receiver at the continuing present time, where a proprietary algorithm may read the present state of important information at the receiver continually and rapidly with only $\frac{1}{100}$th of a second of delay.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device including at least one antenna element, at least one rectifying circuit and at least one power converter, which may utilize pockets of energy for powering, or charging an electronic device.

"Pocket-forming" may refer to generating two or more RF waves which converge in 3-D space, forming controlled constructive and destructive interference patterns.

"Pockets of energy" may refer to areas or regions of space where energy or power may accumulate in the form of constructive interference patterns of RF waves.

"Ad" may refer to one or more Bluetooth Low Energy (BTLE) advertisement message transmitted from a BTLE device.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Methods disclosed here may be part of a wireless power transmission system including two or more wireless power transmitters, one or more wireless power receivers, one or more optional system management servers, and one or more optional mobile or hand-held computers, smart phones, or the like, that run the system management GUI app. This app may be made available at, downloaded, and installed from a public software app store or digital application distribution platform, such as Apple's iTunes, Google's Play Store, Amazon's Appstore, and the like.

The power transmitters and management servers may all communicate with each other through a distributed system database, and may also communicate present status and any status change to a remote information service that may be located in the Internet cloud.

One or more wireless power transmitters may automatically transmit power to any single wireless power receiver that is close enough for it to establish a communication connection with, using a suitable communication technology, including Bluetooth Low Energy or the like. Said receiver may then power or charge an electrically connected client device, such as mobile device, toy, remote control, lighting device, and the like. A single wireless power transmitter may also power multiple wireless power receivers simultaneously.

Alternately, the system can be configured by the system management GUI to automatically only transmit power to specific wireless power receivers depending on specific system criteria or conditions, such as the time or hour of the day for automatic time-based scheduled power transmission, power receiver physical location, owner of client device, or other any other suitable conditions and/or criteria.

The wireless power receiver is connected electrically to a client device, such a mobile phone, portable light, TV remote control, or any device that would otherwise require a battery or connection to wall power. In one or more embodiments, devices requiring batteries can have traditional batteries replaced by wireless power receiver batteries. The wireless power receiver then receives energy transmitted from the power transmitter, into receiver's antenna, rectifies, conditions, and sends the resulting electrical energy, through an electrical relay switch, to the electrically connected client device to power it or charge it.

A wireless power transmitter can transmit power to a wireless power receiver, which, in response, can power or charge its associated client device while device is in use or in motion anywhere within the power transmission range of the wireless power transmitter. The wireless power transmitter can power multiple devices at the same time.

The wireless power transmitter establishes a real-time communication connection with each receiver for the purpose of receiving feedback in real-time (such as 100 samples per second). This feedback from each receiver includes the measurement of energy presently being received, which is used by the transmitter to control the direction of the transmitter's antenna array so that it stays aimed at the receiver, even if the receiver moves to a different physical 3-D location or is in 3-D motion that changes its physical 3D location.

Multiple wireless power transmitters can power a given, single receiver, in order to substantially increase power to it.

When a transmitter is done transmitting power to a receiver, it may communicate to the receiver that power transmission has ended, and disconnect communication. The wireless power transmitter may then examine its copy of the distributed system database to determine which, if any, receivers in power range it should next transmit power to.

FIG. 1 shows a system architecture 100 for a wireless power network, according to an embodiment. System architecture 100 may enable the registration and communication controls between wireless power transmitter 102 and one or more wireless power receivers within a wireless power network. Wireless power receivers may include covers 104 and customer pocket-forming enabled devices 106.

In one embodiment, wireless power transmitter 102 may include a microprocessor that integrates a power transmitter manager app 108 (PWR TX MGR APP), and a third party application programming interface 110 (Third Party API) for a Bluetooth Low Energy chip 112 (BTLE CHIP HW). Wireless power transmitter 102 may also include an antenna manager software 114 (Antenna MGR Software) to control an RF antenna array 116 that may be used to transmit controlled Radio Frequency (RF) waves which may converge in 3-D space. These RF waves may be controlled through phase and/or relative amplitude adjustments to form constructive and destructive interference patterns (pocket-forming). Pockets of energy may form at constructive interference patterns that may be 3-Dimensional in shape whereas null-spaces may be generated at destructive interference patterns. Pockets of energy may be formed on wireless power receivers (covers 104 and customer pocket-forming enabled devices 106). In some embodiment, Bluetooth Low Energy chip 112 may be another type of wireless protocol such as WiFi or the like.

Power transmitter manager app 108 may include a database (not shown), which may store system status, configuration, or relevant information from wireless power receivers such as, identifiers, voltage ranges, location, signal strength and/or any relevant information from a wireless power receivers.

Power transmitter manager app 108 may call third party application programming interface 110 for running a plurality of functions such as start a connection, end a connection, and send data among others. Third party application programming interface 110 may command Bluetooth Low Energy chip 112 according to the functions called by power transmitter manager app 108.

Third party application programming interface 110 at the same time may call power transmitter manager app 108 through a callback function which may be registered in the power transmitter manager app 108 at boot time. Third party application programming interface 110 may have a timer callback that may go for ten times a second, and may send callbacks every time a connection begins, a connection ends, a connection is attempted, or a message is received.

Covers 104 may include a power receiver app 118 (PWR RX APP), a third party application programming interface 120 (Third party API) for a Bluetooth Low Energy chip 122 (BTLE CHIP HW), and a RF antenna array 124 which may be used to receive and utilize the pockets of energy sent from wireless power transmitter 102.

Power receiver app 118 may call third party application programming interface 120 for running a plurality of functions such as start a connection, end the connection, and send data among others. Third party application programming interface 120 may have a timer callback that may go for ten times a second, and may send callbacks every time a connection begins, a connection ends, a connection is attempted, or message is received.

Covers 104 may be paired to a wireless device such as a smartphone, or tablet among others via a BTLE connection 126 by using a graphical user interface (GUI 128) that may be downloaded from any suitable application store and may run on any suitable operating system such as iOS and Android, among others. Covers 104 may also communicate with wireless power transmitter 102 via a BTLE connection 126 to send important data such as an identifier for the device as well as battery level or charge status information, antenna voltage, any other hardware status, software status, geographic location data, or other information that may be of use for the wireless power transmitter 102.

In other embodiments, GUI 128 may also be installed on a wireless device (smartphones or tablets) that may not have the cover 104. GUI 128 may perform operations to communicate with power transmitter manager app 108 via BTLE connection 126 or any other wireless communication protocols such as WiFi, and LAN among others. In this embodiment, GUI management app still performs the same function as previously described, to manage or monitor the wireless power transmission system.

Customer pocket-forming enabled devices 106 may refer to a wireless device such as smartphones, tablets, or any of the like that may include an integrated wireless power receiver circuit (not shown in FIG. 1) for wireless power charging. Customer pocket-forming enabled devices 106 may include a power receiver app 130 (PWR RX APP), and a third party application programming interface 132 (Third Party API) for a Bluetooth Low Energy chip 134 (BTLE CHIP HW). Customer pocket-forming enabled devices 106 may also include an RF antenna array 136 which may receive and utilize pockets of energy sent from wireless power transmitter 102. GUI 138 may be downloaded from any suitable application store and may run on any suitable operating system such as iOS and Android, among others.

Power receiver app 130 may call third party application programming interface 132 for running a plurality of functions such as start a connection, end the connection, and send data among others. Third party application programming interface 132 may have a timer callback that may go for ten times a second, and may send callbacks every time a connection begins, a connection ends, a connection is attempted, or message is received.

Customer pocket-forming enabled devices 106 may also communicate with wireless power transmitter 102 via a BTLE connection 126 to send important data such as an identifier for the device as well as battery level information, antenna voltage, geographic location data, or other information that may be of use for the wireless power transmitter 102.

Figure 2:
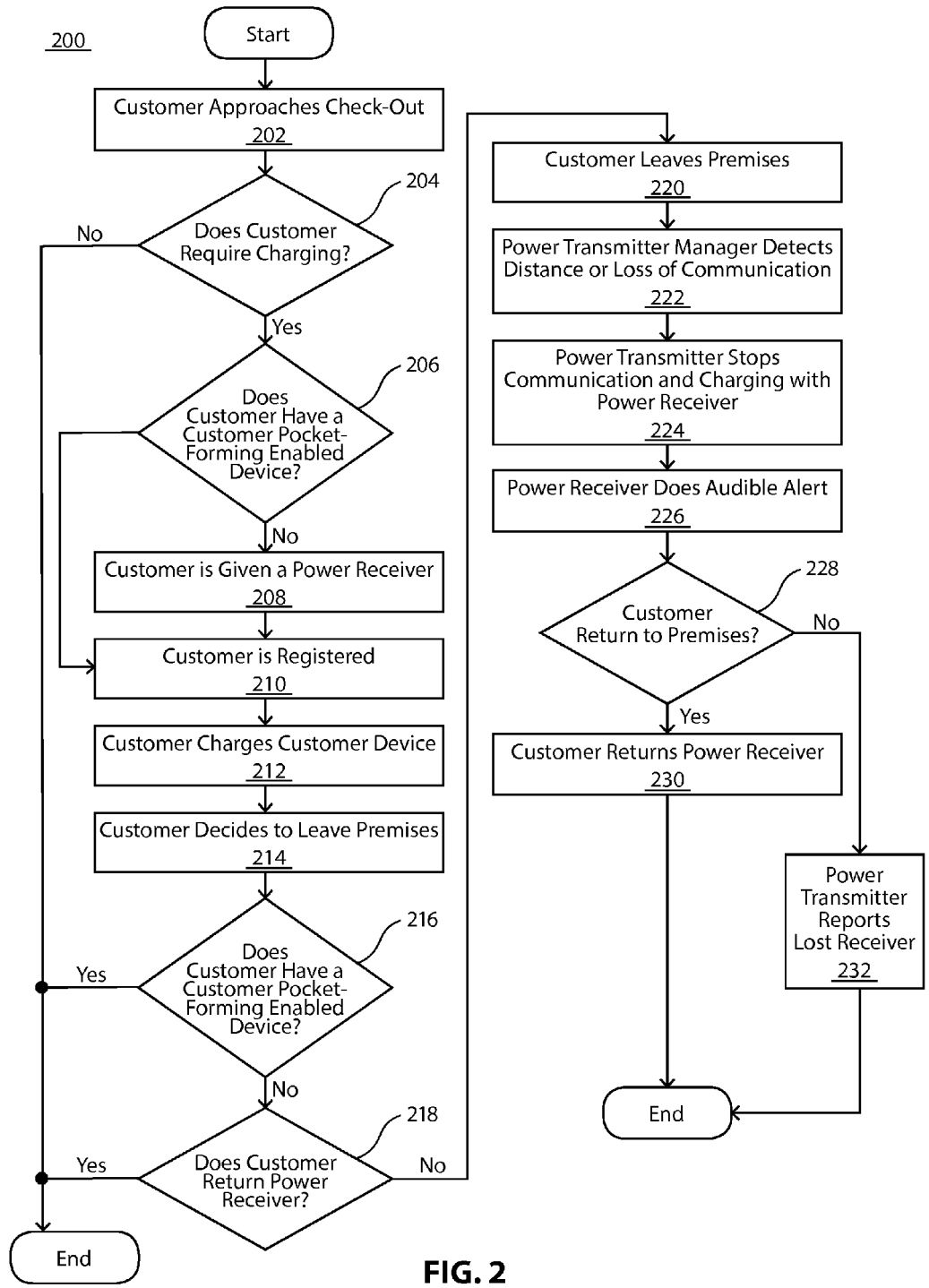
FIG. 2 shows a flowchart for an off-premises alert method for wireless power receivers in a wireless power network, according to an embodiment.

FIG. 2 shows a flowchart for an off-premises alert method 200 for wireless power receivers in a wireless power network.

The wireless power network may include one or more wireless power transmitter and multiple wireless power receivers that may be either a cover or a customer pocket-forming enabled devices.

Method 200 may include automated software embedded on a wireless power receiver that may be triggered every time a wireless power receiver is turned on.

In one embodiment, method 200 may start at step 202 when a customer goes into a shop and approaches the check-out. Then, at step 204, an employee of the shop that may be at the counter may ask the customer if he or she requires charging for the customer's device. If the customer does not require charging for his or her device, then the process ends. If the customer does require charging, the employee may ask the customer if his or her device has a customer pocket-forming enabled device, at step 206. If the customer's device is not a pocket forming enabled device, then at step 208, the customer is given a power receiver device, also referred as a cover, and the employee may use a GUI to register the given cover at step 210. Likewise, if the customer does have a pocket-forming enabled device, the employee may use a GUI to register the customer pocket-forming enabled device at step 210. Then, at step 212, customer may charge his or her device for the time they need charge. Next, at step 214, the customer may decide to leave the premises. Then, at step 216, if the customer has a customer pocket-forming enabled device, the customer may just leave the premises and the process ends. However, if the customer has a power receiver or cover, then the customer may return the cover and leave the premises or he or she may forget to return the cover, at step 218.

If customer forgets to return the cover, he or she may leave the premises at step 220. Subsequently, at step 222, when the customer is at a certain distance away from the store, the power transmitter manager at the store may detect the distance or loss of communication with the power receiver or cover lent to the customer. In other embodiments, the power receiver detects no communication with the power transmitter manager for a minimum amount of time. Then, at step 224, the power transmitter manager may stop communication with and charging the power receiver. The power receiver, then at step 226, may generate an audible alert that the customer may hear as he or she goes further from the store. Subsequently, at step 228, the customer may decide to whether return to premises or not. If customer returns to premises, then at step 230, customer may return the power receiver. If customer decides to not return to premises, then at step 232, power transmitter reports details of the lost receiver such as when, where, and receiver's ID among others, to the system management server or the remote information service that are both part of the wireless power transmission system's network.

EXAMPLES

In example #1 a customer enters a coffee shop and buys a cup of coffee. At checkout, the customer asks for power to charge a smartphone. The customer's smartphone includes a suitable GUI for interacting with a wireless power network. A power receiver or cover with an embedded power receiver is associated with the customer, by an employee using a GUI device, and the cover is given to the customer. Then, the smartphone is paired with a power receiver or cover. The smartphone starts receiving power from the power transmitter as long as the customer stays in the coffee shop. After some time, the smartphone reaches a desired level of charge and the customer leaves the coffee shop. Subsequently, when the customer is at a certain distance away from the coffee shop, the power transmitter manager may detect the distance or loss of communication with the power receiver or cover lent to the customer, and then stop charging and communication with the power receiver. Then, the power receiver or cover may generate an audible alert that may increase in volume as the customer gets further from the coffee shop. The customer then hears the alert and returns to the coffee shop to return the power receiver or cover.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method for controlling wireless power transmission to an electronic device, comprising the steps of:
   receiving, by a transmitter, a communication of a power requirement of an electronic device and a location of a receiver associated to the electronic device;
   upon recognition of the location as an authorized location of the receiver, generating, by the transmitter, power transmission waves that converge to form a pocket of energy;
   controlling, by the transmitter, generated power transmission waves to provide phase shifting and gain shifting with respect to other power transmission waves;
   transmitting, by the transmitter, the power transmission waves through at least two antennas coupled to the transmitter; and
   terminating, by the transmitter, the transmission of the power transmission waves upon recognition of the location as an unauthorized location of the receiver.

2. The method according to claim 1, further comprising:
   communicating, by the transmitter, an alert to the electronic device upon recognition of the location as the unauthorized location of the receiver, the alert being an audible alert configured to be heard by a user of the electronic device.

3. The method according to claim 1, further comprising:
   communicating, by the transmitter, an alert to the electronic device upon recognition of the location as the authorized location of the receiver, the alert being a visible alert configured to be displayed on a display associated with the electronic device.

4. The method according to claim 1, wherein the antennas of the transmitter are one or more of flat antennas, patch antennas, dipole antennas, or combinations thereof.

5. The method according to claim 1, wherein the antennas of the transmitter are configured to polarize the power transmission waves to include vertical polarization, horizontal polarization, circular polarization, elliptical polarization, or combinations thereof.

6. The method according to claim 1, wherein the transmitter is coupled to a digital signal processor configured to control a plurality of functionalities associated with the transmitter, the plurality of functionalities including one or more of timing of transmission of the power transmission waves, a direction of transmission of the power transmission waves, and an intensity of the pocket of energy.

* * * * *